United States Patent
Watanabe

(10) Patent No.: US 7,471,015 B2
(45) Date of Patent: Dec. 30, 2008

(54) ELECTRONIC APPARATUS CONTROLLING AN ELECTRIC POWER SUPPLY TO A MAIN MICROPROCESSOR AND PERIPHERAL DEVICES THROUGH AN AUXILIARY MICROPROCESSOR

(75) Inventor: Satomi Watanabe, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 163 days.

(21) Appl. No.: 11/497,270

(22) Filed: Aug. 2, 2006

(65) Prior Publication Data

US 2007/0029882 A1  Feb. 8, 2007

(30) Foreign Application Priority Data

Aug. 3, 2005 (JP) ............................. 2005-225331

(51) Int. Cl.
*H01H 83/18* (2006.01)
*G05B 19/18* (2006.01)
*G05B 11/01* (2006.01)

(52) U.S. Cl. ............................. 307/125; 700/2; 700/21
(58) Field of Classification Search ................ 307/125, 307/126; 700/2, 21
See application file for complete search history.

(56) References Cited

U.S. PATENT DOCUMENTS

| 5,471,621 | A | 11/1995 | Ohtsuki |
| 6,611,508 | B1 * | 8/2003 | Abe ............................. 370/332 |
| 6,822,764 | B1 * | 11/2004 | Okabe et al. ................ 358/442 |

| 2004/0243734 | A1 * | 12/2004 | Kitagawa et al. .............. 710/13 |

FOREIGN PATENT DOCUMENTS

| JP | 64-12321 A | 1/1989 |
| JP | 4-333119 A | 11/1992 |
| JP | 10-49265 A | 2/1998 |

OTHER PUBLICATIONS

Tsuneo et al., Machine translation from JPO website for JP-10-49265, Feb. 20, 1998.*

* cited by examiner

*Primary Examiner*—Michael J Sherry
*Assistant Examiner*—Michael Rutland Wallis
(74) *Attorney, Agent, or Firm*—Crowell & Moring LLP

(57) ABSTRACT

In an electronic apparatus such as a DVD recorder (1) which controls electric power supply to a main micro processor (3) and peripheral devices (10, 11, 15) with a auxiliary micro processor (4), a power control method by the auxiliary micro processor (4) can be changed. The main micro processor (3) transmits a power control data, which indicates a control method of the electric power supply, to the auxiliary micro processor (4). The auxiliary micro processor (4) controls the electric power supply by a method indicated by the power control data. Contents of the power control data is composed of sixteen bits data, and each four bits data as a unit indicate a control method of a power control terminal "REG_CTRL 1" (41) during a switching off operation of a power switch (6), a control method of the power control terminal "REG_CTRL 1" (41) during a switching off operation of the power switch (6), a control method of a power control terminal "PWSW" (43) during the switching off operation of the power switch (6), and a control method of the power control terminal "PWSW" (43) during the switching on operation of the power switch (6).

6 Claims, 2 Drawing Sheets

| REG_CTRL1 | | | | PWSW | | | |
|---|---|---|---|---|---|---|---|
| POWER SWITCH OFF | | POWER SWITCH ON | | POWER SWITCH OFF | | POWER SWITCH ON | |
| b15 OPERATION FLAG | b14-b12 TIME DATA | b11 OPERATION FLAG | b10-b8 TIME DATA | b7 OPERATION FLAG | b6-b4 TIME DATA | b3 OPERATION FLAG | b2-b0 TIME DATA |

ELECTRONIC APPARATUS CONTROLLING AN ELECTRIC POWER SUPPLY TO A MAIN MICROPROCESSOR AND PERIPHERAL DEVICES THROUGH AN AUXILIARY MICROPROCESSOR

BACKGROUND OF THE INVENTION

1. Field of the Invention

The present invention relates to an electronic apparatus comprising a main micro processor and an auxiliary micro processor and controlling an electric power supply to the main micro processor and peripheral devices through the auxiliary micro processor.

2. Description of the Related Art

With regard to an electronic apparatus such as a DVD recorder comprising a main micro processor and an auxiliary micro processor, it is conventionally known that the auxiliary micro processor controls electric power supply to the main micro processor and peripheral devices. In such an electronic apparatus, a program and data relating to a power control method for controlling the electric power supply are stored in a mask ROM (Read Only Memory) in the auxiliary micro processor, and the auxiliary micro processor controls the electric power supply to the main micro processor and the peripheral devices based on the program and the data stored in its own mask ROM.

Japanese Laid-Open Patent Publication No. 4-333119 discloses an electronic apparatus that a power control circuit is monitored and controlled with a sub-CPU and a power source of a device not in use is switched off with an input-output device. Japanese Laid-Open Patent Publication No. 10-049265 discloses an electronic apparatus that a sub-CPU switches off a power source of an I/O device by compulsion when receiving an order from a main CPU. Japanese Laid-Open Patent Publication No. 64-012321 discloses an electronic apparatus that a system power control unit composed of a one-chip microcomputer is mounted separately from a main CPU and a calendar updating and a power control are operated by the system power control unit in isolation from the main-CPU.

However, with regard to the conventional electronic apparatuses described above, since the auxiliary micro processor is constituted to have a mask ROM system, a program and data regarding a power control method stored in the mask ROM of the auxiliary micro processor cannot be rewritten. For this reason, in case that the power control method needs to be changed due to a problem that a main micro processor and peripheral devices do not function well when a power source is supplied to them, the auxiliary micro processor having the mask ROM system has to be remade every time, thus a problem such as a delay of a due date or a cost increase arises.

SUMMARY OF THE INVENTION

The present invention is to solve the problem described above, and an object of the present invention is to provide an electronic apparatus that a power control method with an auxiliary micro processor can be changed.

In order to achieve the object described above, an electronic apparatus in accordance with an aspect of the present invention comprises: a main micro processor; a auxiliary micro processor communicating with the main micro processor; peripheral devices which are controlled by the main micro processor and the auxiliary micro processor or which operate the main micro processor and/or the auxiliary micro processor; a power supply circuit which generates an electric power to activate the main micro processor, the auxiliary micro processor, and the peripheral devices; and a power switch which is switched on/off by a user to provide an instruction to supply/cut off the electric power to the main micro processor and the peripheral devices.

The main micro processor transmits a power control data, which indicates a power control method for controlling the electric power supply to the main micro processor and the peripheral devices. The auxiliary micro processor controls electric power supply to the main micro processor and the peripheral devices by a power control method which is indicated by the power control data transmitted from the main micro processor.

According to such a constitution, the auxiliary micro processor controls the electric power supply by the power control method which is indicated by the power control data transmitted from the main micro processor, so that the power control method of the auxiliary micro processor can be changed with changing contents of the power control data transmitted from the main micro processor. Accordingly, in case that the power control method needs to be changed due to, for example, the problem of a circuit board, the power control method can be changed by changing the contents of the power control data transmitted from the main micro processor instead of ordering the auxiliary micro processor having the mask ROM system, and the chance of the delay of the due date or the cost increase can be reduced.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
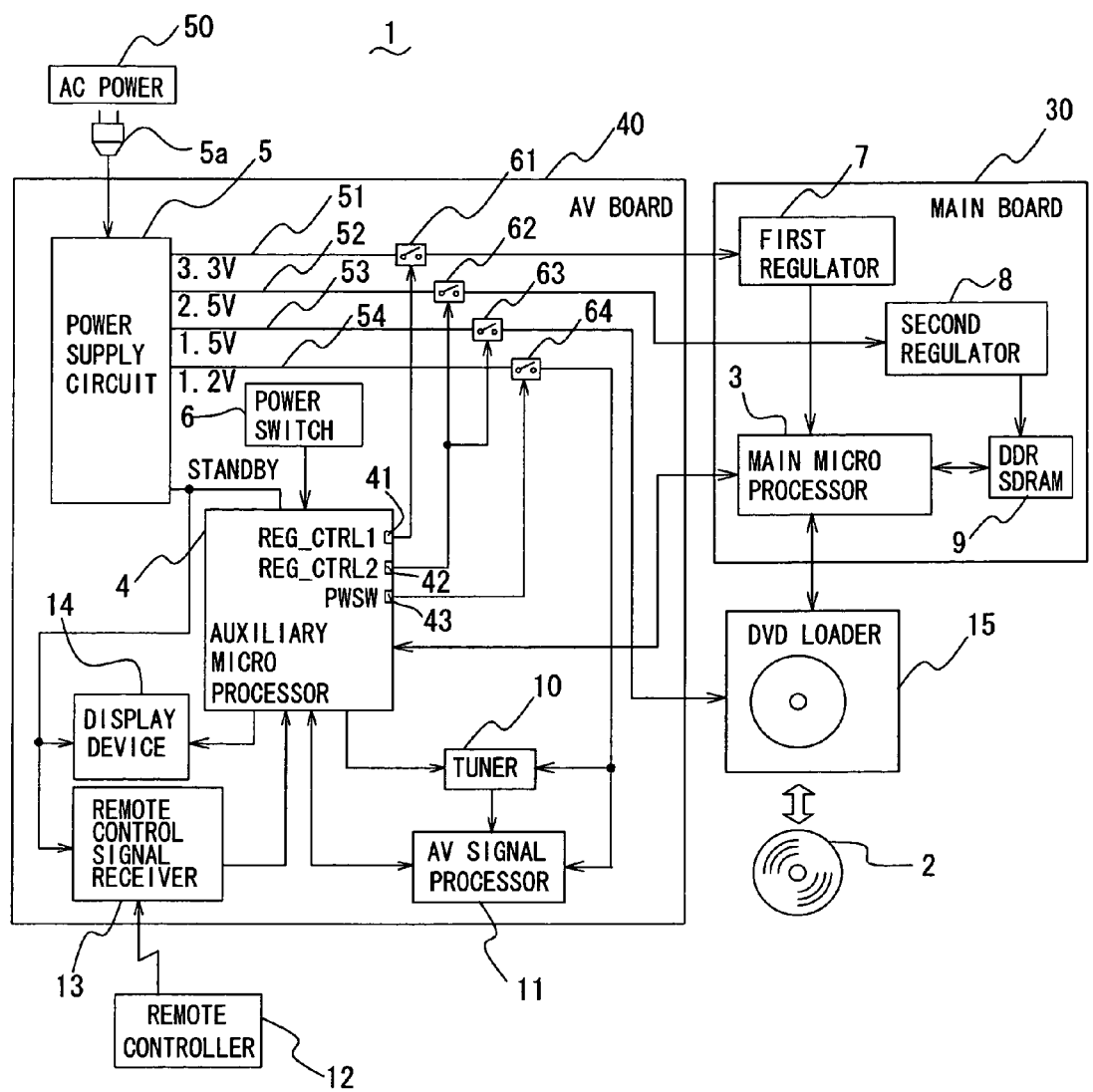
FIG. 1 is an electric block configuration diagram schematically showing a constitution of a DVD recorder which is an example of an electronic apparatus in accordance with an embodiment of the present invention.

An electronic apparatus in accordance with an embodiment of the present invention is described with reference to the drawings. FIG. 1 shows a constitution of a DVD (Digital Versatile Disc) recorder 1, which is an example of the electronic apparatus. The DVD recorder 1 receives TV (Television) broadcast signals from broadcast stations, stores video data, audio data, and so on delivered with the TV broadcast signals into a DVD 2, and reproduces the video data, the audio data, and so on stored in the DVD 2 through a display and a speaker not shown in the drawings.

The DVD recorder 1 comprises a main micro processor 3 and a auxiliary micro processor 4 to control the DVD recorder 1, a power supply circuit 5 generating an electric power for driving the DVD recorder 1, a power switch 6 for activating or inactivating the DVD recorder 1, a first regulator 7, a second regulator 8, a DDRSDRAM (Double Data Rate Synchronous Dynamic Random Access Memory) 9, a tuner 10, an AV signal processor 11, a remote controller 12, a remote control signal receiver 13, a display device 14 such as an LCD, and a DVD loader 15.

The main micro processor 3, the first regulator 7, the second regulator 8, and the DDRSDRAM 9 are disposed on a main board 30, and the auxiliary micro processor 4, the power supply circuit 5, the power switch 6, the tuner 10, the AV signal processor 11, the remote control signal receiver 13, the display device 14 are disposed on an AV board 40. The DDRSDRAM 9 and the DVD loader 15 are peripheral devices controlled with the main micro processor 3. The tuner 10, the AV signal processor 11, and the display device 14 are peripheral devices controlled with the auxiliary micro processor 4. The first regulator 7 and the second regulator 8 are peripheral devices for operating the main micro processor 3, and the power switch 6, the remote controller 12, and the remote control signal receiver 13 are peripheral devices for operating the auxiliary micro processor 4.

An AC power is supplied to the power supply circuit 5 from a commercial AC power source 50 when connecting an AC inlet 5a to the commercial AC power source 50, and the power supply circuit 5 generates electric powers for driving the DVD recorder 1 with using the AC power. The power supply circuit 5 includes five power supply lines 51 to 55. The power supply circuit 5 generates electric powers respectively having voltages of 3.3 V, 2.5 V, 1.5 V and 1.2 V and a standby electric power with using the electric power supplied from the commercial AC power source 50, and supplies respective electric powers through the power supply lines 51 to 55.

Power control switches 61 to 64 are respectively provided on the power supply lines 51 to 54 in the power supply circuit 5. The auxiliary micro processor 4 includes three power control terminals 41, 42, and 43, that is, "REG_CTRL 1", "REG_CTRL 2", and "PWSW" for switching on and off the power control switches 61 to 64. The power control switch 61 is connected to the power control terminal "REG_CTRL 1" 41 of the auxiliary micro processor 4. The power control switches 62 and 63 are connected to the power control terminal "REG_CTRL 2" 42 of the auxiliary micro processor 4. The power control switch 64 is connected to the power control terminal "PWSW" 43 of the auxiliary micro processor 4.

The power switch 6 is switched on or off by a user for activating or inactivating the DVD recorder 1. When the power switch 6 is switched on or off, a switching on signal or a switching off signal is input to the auxiliary micro processor 4.

The first regulator 7 stabilizes a voltage of an electric power supplied to the main micro processor 3. The main micro processor 3 and the first regulator 7 are connected to the power supply line 51 of the power supply circuit 5 through the power control switch 61. The second regulator 8 stabilizes a voltage of an electric power supplied to the DDRSDRAM 9. The second regulator 8 and the DDRSDRAM 9 are connected to the power supply line 52 of the power supply circuit 5 through the power control switch 62.

The tuner 10 receives TV broadcast signals delivered from broadcast stations under control of the auxiliary micro processor 4. The AV signal processor 11 processes video data and audio data included in the TV broadcast signals received through the tuner 10 and processes video data and audio data readout through the DVD loader 15 under control of the auxiliary micro processor 4. The tuner 10 and the AV signal processor 11 are connected to the power supply line 54 of the power supply circuit 5 through the power control switch 64.

The remote controller 12 is operated by a user so as to instruct various actions of the DVD recorder 1 such as selection of receiving channels of the TV broadcast signals, recording of video data and audio data delivered from the TV broadcast signals into the DVD 2, reproducing of the video data and the audio data recorded in the DVD 2, and so on. The remote controller 12 comprises various operation key pads operated by the user so as to instruct, various actions of the DVD recorder 1. When operating the operation key pads, the remote controller 12 transmits infrared-ray signals which correspond to the operations to the remote control signal receiver 13. In addition, a switch (not illustrated) to activate the DVD recorder 1, in other words, having the same function as the power switch 6 described above is provided on the remote controller 12. The remote controller 12 works with using an electric power of a battery embedded therein.

The remote control signal receiver 13 receives infrared-ray signals transmitted from the remote controller 12, converts them into electric signals, and then outputs signals which correspond to the operations of the remote controller 12 to the auxiliary micro processor 4. The display device 14 displays a date, a time, a channel of currently receiving TV broadcast signals, a recording status, and so on, under control of the auxiliary micro processor 4. The auxiliary micro processor 4, the remote control signal receiver 13, and the display device 14 are connected to the power supply line 55 of the power supply circuit 5.

The DVD loader 15 records data into the DVD 2, reads out the data from the DVD 2 and reproduced the data under control of the main micro processor 3. The DVD loader 15 is connected to the power supply line 53 of the power supply circuit 5 through the power control switch 63.

The power control switch 61 is switched on when a voltage level of the power control terminal 41 of the auxiliary micro processor 4 is higher than a threshold (hereinafter, it is abbreviated as "high"), and then supplies the electric power of the voltage 3.3 V which is generated by the power supply circuit 5 to the main micro processor 3 and the first regulator 7, and it is switched off when the voltage level is lower than the threshold (hereinafter, it is abbreviated as "low"), and then cuts off the electric power supply to the main micro processor 3 and the first regulator 7.

The power control switch 62 is switched on when a voltage level of the power control terminal 42 of the auxiliary micro processor 4 is high, and then supplies the electric power of the voltage 2.5 V to the second regulator 8 and the DDRSDRAM 9, and it is switched off when the voltage level is low, and then cuts off the electric power supply to the second regulator 8 and the DDRSDRAM 9.

The power control switch 63 is switched on when a voltage level of the power control terminal 42 of the auxiliary micro processor 4 is high, and then supplies the electric power of the voltage 1.5 V to the DVD loader 15, and it is switched off when the voltage level is low, and then cuts off the electric power supply to the DVD loader 15.

The power control switch 64 is switched on when a voltage level of the power control terminal 43 of the auxiliary micro processor 4 is high, and then supplies the electric power of the voltage 1.2 V to the tuner 10 and the AV signal processor 11, and it is switched off when the voltage level is low, and then cuts off the electric power supply to the tuner 10 and the AV signal processor 11.

The main micro processor 3 and the auxiliary micro processor 4 communicate with each other and control the action of the DVD recorder 1. The auxiliary micro processor 4 further controls the electric power supply for activating and inactivating the DVD recorder 1 in response to switching on and off operation of the power switch 6.

When the power switch 6 is switched on, the auxiliary micro processor 4 switches voltage levels of the power control terminals 41 to 43 to high-levels each so as to switch on the power control switches 61 to 64. Accordingly, the electric powers are supplied from the power supply circuit 5 to the main micro processor 3, the first regulator 7, the second regulator 8, the DDRSDRAM 9, the tuner 10, the AV signal processor 11, and the DVD loader 15. When the power switch 6 is switched off, the auxiliary micro processor 4 switches voltage levels of the power control terminals 41 to 43 to low levels each so as to switch off the power control switches 61 to 64. Accordingly, the electric power supply from the power supply circuit 5 to the main micro processor 3, the first regulator 7, the second regulator 8, the DDRSDRAM 9, the tuner 10, the AV signal processor 11, and the DVD loader 15 is cut off.

In other words, the instruction to supply or cut off the electric power for activating the DVD recorder 1 (or the instruction for activating or inactivating the DVD recorder 1) is provided to the auxiliary micro processor 4 by switching on or off the power switch 6. In response to the instruction, the auxiliary micro processor 4 controls the supply or cut off of the electric powers to the main micro processor 3, the first regulator 7, the second regulator 8, the DDRSDRAM 9, the tuner 10, the AV signal processor 11, and the DVD loader 15. At this time, in response to the switching on or off operation of the power switch 6, the auxiliary micro processor 4 switches on or off the power control switches 61 to 64 at individual timings by switching the power control terminals 41 to 43 to the high level or to the low level at individual timings. Thereby, the electric powers are supplied or cut off to the main micro processor 3, the first regulator 7, the second regulator 8, the DDRSDRAM 9, the tuner 10, the AV signal processor 11, and the DVD loader 15 at individual timings.

The auxiliary micro processor 4, the remote control signal receiver 13, and the display device 14 are connected to the power supply line 55 of the power supply circuit 5. Even when the power switch 6 is switched off, the standby electricity is supplied to them through the power supply line 55, and then they works.

The main micro processor 3 stores power control data, which indicate timings for switching the power control terminals 41 to 43 between the high level and the low level during the switching on or off operation of the power switch 6 (that is, a power control method), in a rewritable ROM in the main micro processor 3 preliminarily. When the electric power is supplied from the power supply circuit 5 (or from the first regulator 7), the main micro processor 3 transmits the power control data to the auxiliary micro processor 4 by a serial data communication.

When the power control data are transmitted from the main micro processor 3, the auxiliary micro processor 4 stores the power control data into a RAM (Random Access Memory) in the auxiliary micro processor 4. Ever since then, when the power switch 6 is switched on or off, the auxiliary micro processor 4 switches the power control terminals 41 to 43 to the high level or the low level at the timings indicated by the power control data (that is, the power control method transmitted from the main micro processor 3 and stored in the RAM).

The power control data stored in the rewritable ROM in the main micro processor 3 are not erased even when the electric power supply to the main micro processor 3 is cut off, and it can be rewritten by inputting a rewrite signal into the main micro processor 3. On the contrary, the power control data stored in the RAM in the auxiliary micro processor 4 are erased when the electric power supply to the auxiliary micro processor 4 is cut off (that is, when the electric power supply from the commercial AC power 50 to the power supply circuit 5 is cut off). For this reason, the auxiliary micro processor 4 stores power control data into a mask ROM in the auxiliary micro processor 4 preliminarily as default data. Until power control data are transmitted from the main micro processor 3 after starting the electric power supply to the auxiliary micro processor 4 (that is, after staring the electric power supply from the commercial AC power 50 to the power supply circuit 5), the auxiliary micro processor 4 switches the power control terminals 41 to 43 to the high level/the low level at a timing indicated by the default data of the power control data stored in the mask ROM when the power switch 6 is switched on or off. The default data of the power control data stored in the mask ROM in the auxiliary micro processor 4 is not erased even when the electric power supply to the auxiliary micro processor 4 is cut off, and moreover, it never be rewritten.

Figures 2, 3:
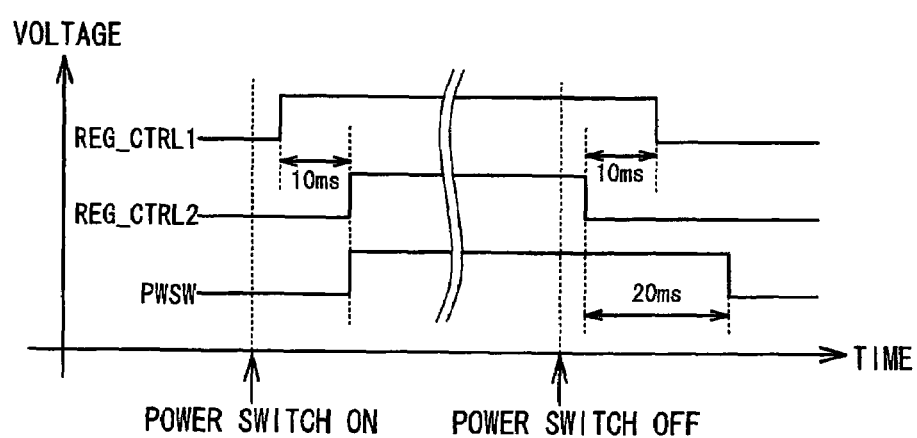
FIG. 2 is a drawing for explaining a communication message of a power control data of the DVD recorder.
FIG. 3 is a voltage waveform chart of power control terminals, which indicates a control operation of the power control terminals by an auxiliary micro processor of the DVD recorder.

FIG. 2 shows contents of the power control data transmitted from the main micro processor 3 to the auxiliary micro processor 4 described above. The contents of the power control data are composed of two bytes (sixteen bits) of data, that is "b15", "b14" . . . "b1", and "b0". Higher one byte data "b15" to "b8" in these two bytes data of the power control data indicate a control method of the power control terminal "REG_CTRL 1" 41 which is based on the power control terminal "REG_CTRL 2" 42. Lower one byte data "b7" to "b0" indicate a control method of the power control terminal "PWSW" 43 which is based on the power control terminal "REG_CTRL 2" 42. Furthermore, higher four bits data in each one byte data "b15" to "b12" and "b7" to "b4" indicate a control method when the power switch 6 is switched off, and lower four bits data "b11" to "b8" and "b3" to "b0" indicate a control method when the power switch 6 is switched on.

In other words, the contents of the power control data is composed of sixteen bits data, each four bits data indicating switching timings. First four bits data "b15" to "b12" indicate a timing for switching the power control terminal "REG_CTRL 1" 41 to a low level based on timing for switching the power control terminal "REG_CTRL 2" 42 to the low level in switching off operation of the power switch 6. Second four bits data "b11" to "b8" indicate a timing for switching the power control terminal "REG_CTRL 1" 41 to the high level based on the timing for switching the power control terminal "REG_CTRL 2" 42 to the high level during the switching on operation of the power switch 6. Third four bits data "b7" to "b4" indicate a timing for switching the power control terminal "PWSW" 43 to the low level based on the timing for switching the power control terminal "REG_CTRL 2" 42 to the low level during the switching off operation of the power switch 6. Fourth four bits data "b3" to "b0" indicate a timing for switching the power control terminal "PWSW" 43 to the high level based on the timing for switching the power control terminal "REG_CTRL 2" 42 to the high level during the switching on operation of the power switch 6.

Furthermore, in each four bits data "b15" to "b12", "b11" to "b8", "b7" to "b4", or "b3" to "b0", each of the highest-order bit data "b15", "b11", "b7", and "b3" indicates "an operation flag" whether the power control terminals 41 and 43 are switched to the low level or the high level earlier than the power control terminal "REG_CTRL 2" 42 or later than the power control terminal "REG_CTRL 2" 42. The lower three bits data "b14" to "b12", "b10" to "b8", "b6" to "b4", and "b2" to "b0" each indicate "a timing data" for switching the power control terminals 41 and 43 to the low level or the high level earlier than or later than the power control terminal "REG_CTRL 2" 42.

The operation flag which is the highest-order bit data in each four bits data takes a value of "0" or "1". When the operation flag takes the value "0", it indicates that the power control terminals 41 and 43 are switched to the low level or the high level earlier than the power control terminal "REG_CTRL 2" 42. Alternatively, when the operation flag takes the value "1", it indicates that the power control terminals 41 and 43 are switched to the low level or the high level later than the power control terminal "REG_CTRL 2" 42. The timing data which corresponds to the lower three bits data in each four bits data takes any one value from "000" to "111" indicated in binary numbers (corresponding to a value from 0 to 7 indicated in decimal numbers), and it indicates that the power control terminals 41 and 43 are switched to a low level or a high level earlier than or later than the power control terminal "REG_CTRL 2" 42 by a timing indicated by the value (a measure is 10 ms). For example, when the timing data takes a value "001", it shows that the power control terminals 41 and 43 are switched to a low level or a high level earlier than or later than the power control terminal "REG_CTRL 2" 42 by 1 ms. Similarly, when the timing data takes a value "111", it shows that the power control terminals 41 and 43 are switched to a low level or a high level earlier than or later than the power control terminal "REG_CTRL 2" 42 by 70 ms. In addition, when the timing data takes a value "000", it shows that the power control terminals 41 and 43 are switched to the low level or the high level at the same timing of the power control terminal "REG_CTRL 2" 42.

The main micro processor 3 stores such "the operation flag" and "the timing data" in the rewritable ROM as the power control data. When the main micro processor 3 receives the electric power supply from the power supply circuit 5 (or from the first regulator 7), it transmits the power control data to the auxiliary micro processor 4 in the above mentioned communication form. Then, when the auxiliary micro processor 4 receives the power control data from the main micro processor 3, it stores the power control data in the RAM as described above, and controls the voltage levels of the power control terminal 41 to 43 at the timing indicated by the power control data ("the operation flag" and "the timing data").

Subsequently, a control operation of the power control terminals 41 to 43 with the auxiliary micro processor 4 is described with reference to FIG. 3. FIG. 3 shows an example that a communication message of the power control data transmitted from the main micro processor 3 to the auxiliary micro processor 4 is "1001000110100000". In this example, the first four bits data corresponds to "1001", the second four bits data corresponds to "0001", the third four bits data corresponds to "1010", and the fourth four bits data corresponds to "0000". Furthermore, with respect to the first four bits data "1001", "the operation flag", that is, the highest one bit data, corresponds to "1" and "the timing data", that is, the lower three bits data, corresponds to "001". With respect to the second four bits data "0001", "the operation flag" corresponds to "0" and "the timing data" corresponds to "001". With respect to the third four bits data "1010", "the operation flag" corresponds to "1" and "the timing data" corresponds to "010". With respect to the second four bits data "0000", "the operation flag" corresponds to "0" and "the timing data" corresponds to "000".

In other words, the first four bits data "1001" in this communication message of the power control data indicates that the power control terminal "REG_CTRL 1" 41 is switched to the low level 10 ms later than the power control terminal "REG_CTRL 2" 42 during the switching off operation of the power switch 6. The second four bits data "0001" indicates that the power control terminal "REG_CTRL 1" 41 is switched to the high level 10 ms earlier than the power control terminal "REG_CTRL 2" 42 during the switching on operation of the power switch 6. The third four bits data "1010" indicates that the power control terminal "PWSW" 43 is switched to the low level 20 ms later than the power control terminal "REG_CTRL 2" 42 during the switching off operation of the power switch 6. The fourth four bits data "0000" indicates that the power control terminal "PWSW" 43 is switched to the low level simultaneously with the power control terminal "REG_CTRL 2" 42 during the switching on operation of the power switch 6.

Therefore, in case that the contents of the communication message of the power control data is "1001000110100000" as mentioned above, during the switching on operation of the power switch 6, the auxiliary micro processor 4 switches firstly the power control terminal "REG_CTRL 1" 41 to the high level, and after passing 10 ms, it switches the power control terminal "REG_CTRL 2" 42 and the power control terminal "PWSW" 43 to the high level simultaneously with each other, as shown in FIG. 3. Alternatively, during the switching off operation of the power switch 6, the auxiliary micro processor 4 switches firstly the power control terminal "REG_CTRL 2" 42 to the low level, and after passing 10 ms, it switches the power control terminal "REG_CTRL 1" 41 to the low level, and after passing further 10 ms, it switches the power control terminal "PWSW" 43 to the low level.

Besides, until the power control data is transmitted from the main micro processor 3 to the auxiliary micro processor 4 after the electric power supply to the auxiliary micro processor 4 is started, the auxiliary micro processor 4 controls the voltage levels of the power control terminals 41 to 43 at the timings indicated by the default data of the power control data stored in the mask ROM in the auxiliary micro processor 4, as described above.

According to the DVD recorder 1 having such a constitution, since the auxiliary micro processor 4 controls the electric power supply by the power control method which is indicated by the power control data transmitted from the main micro processor 3, it is possible to change the power control method with the auxiliary micro processor 4 by changing the contents of the power control data transmitted by the main micro processor 3, that is, the value of "the operation flag" and "the timing data" which are stored in the rewritable ROM in the main micro processor 3. Thus, when it is needed to change the power control method, the power control method can be changed by changing the contents of the power control data transmitted from the main micro processor 3 instead of ordering the auxiliary micro processor 4 having the mask ROM system.

In addition, when the DVD recorder 1 is connected to the commercial AC power 50 and the electric power supply is started to the main micro processor 3, the power control data is transmitted from the main micro processor 3 to the auxiliary micro processor 4, and afterwards, the auxiliary micro processor 4 controls the electric power supply to the main micro processor 3 and the peripheral devices by the power control method indicated by the power control data. Thus, the change of the power control method is applied only by changing the contents of the power control data stored in the main micro processor 3, and thereby, the power control method can be changed by a simple and easy operation.

Furthermore, the power control data transmitted from the main micro processor 3 to the auxiliary micro processor 4 indicates the timings for switching the power control terminals 41 and 43 to the low level/the high level based on the power control terminal 42. These timings are indicated by "the operation flag" and "the timing data" where "the operation flag" indicates whether the power control terminals 41 and 43 are switched to the low level/the high level earlier than or later than the second power control terminal 42, and "the timing data" indicate the timing for switching the power control terminals 41 and 43 to the low level/the high level earlier than or later than the power control terminal 42. Thus, the communication message becomes simple and a less communication capacity is needed, so that the power control data does not become a charge on the operations of the main micro processor 3 and the auxiliary micro processor 4.

The present invention, however, is not limited to the constitution of the embodiment described above, and various modifications are applicable. For example, the two boards, that is, the main board 30 and the AV board 40, are not necessary in the embodiment described above. It is possible to provide the main micro processor 3, the auxiliary micro processor 4, the power supply circuit 5, and the peripheral devices (the first regulator 7, the second regulator 8, the DDRSDRAM 9, the tuner 10, the AV signal processor 11, the remote control signal receiver 13, the display device 14, and the DVD loader 15) on the same board. Furthermore, the present invention is not limited to the DVD recorder 1. It is also applicable to electronic devices such as a VCR, a hard disk recorder, a TV broadcast receiver, an image display projector, a printer, and so on, for example.

This application is based on Japanese patent application 2005225331 filed Aug. 3, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An electronic apparatus comprising:
a main micro processor;
a auxiliary micro processor communicating with the main micro processor;
peripheral devices which are controlled by the main micro processor and the auxiliary micro processor or which operate the main micro processor and/or the auxiliary micro processor;
a power supply circuit which generates at least an electric power to activate the main micro processor, the auxiliary micro processor, and the peripheral devices; and
a power switch which is switched on/off by a user to provide an instruction to supply/cut off the electric power to the main micro processor and the peripheral devices; wherein
the main micro processor transmits a power control data, which indicates a power control method for controlling the electric power supply to the main micro processor and the peripheral devices; and
the auxiliary micro processor controls the electric power supply to the main micro processor and the peripheral devices by a power control method which is indicated by the power control data transmitted from the main micro processor; wherein
the auxiliary micro processor stores power control data into a mask ROM (Read Only Memory) in the auxiliary micro processor preliminarily as default data; and until power control data are transmitted from the main micro processor after starting the electric power supply to the auxiliary micro processor, the auxiliary micro processor controls the electric power supply to the main micro processor and the peripheral devices using the default data.

2. The electronic apparatus in accordance with claim 1, wherein
the power supply circuit includes power supply lines connected to the main micro processor, the auxiliary micro processor, and the peripheral devices;
power control switches are further provided on the power supply lines respectively; and
the auxiliary micro processor controls timing for switching on/off the power control switches at individual timings corresponding to power control method.

3. The electronic apparatus in accordance with claim 1, wherein
the main micro processor stores the power control data into a rewritable ROM in the main micro processor preliminary, and transmits the power control data to the auxiliary micro processor when main micro processor is activated by receiving the electric power.

4. The electronic apparatus in accordance with claim 3, wherein
the auxiliary micro processor stores the power control data transmitted from the main micro processor into a RAM (Random Access memory).

5. The electronic apparatus in accordance with claim 2, wherein
the contents of the power control data is composed of a plurality of four bits data, a highest one bit data of each four bits data is an operation flag indicating control method of the electric power supply and lower three bits data is timing data indicating the timing for controlling the electric power supply.

6. An electronic apparatus comprising:
a main micro processor;
a auxiliary micro processor communicating with the main micro processor;
peripheral devices which are controlled by the main micro processor and the auxiliary micro processor or which operate the main micro processor and/or the auxiliary micro processor work;
a power supply circuit which is connected to/cut off from a commercial AC power and which generates electric powers for activating the main micro processor, the auxiliary micro processor, and the peripheral devices work, based on an electric power supplied from the commercial AC power; and
a power switch which is switched on/off to provide an instruction to supply/cut off an electric power to the main micro processor and the peripheral devices; wherein
the main micro processor and the peripheral devices are connected to power supply lines of the power supply circuit through power control switches which are switched on/off by the auxiliary micro processor; and
the auxiliary micro processor controls electric power supply from the power supply circuit to the main micro processor and the peripheral devices by switching on/off the power control switches in response to a switching on operation or a switching off operation of the power switch;
the power supply circuit includes at least three power supply lines;

the auxiliary micro processor includes three power control terminals of first to third power control terminals to switch on/off the power control switches;

the power control switches are provided on the at least three power supply lines, respectively, and are connected to one of the first to third power control terminals of the auxiliary micro processor, and moreover, when a voltage level of a connected power control terminal is high, each of the power control switches is switched on and then supplies an electric power generated by the power supply circuit, and when a voltage level is low, each of the power control switches is switched off and then cuts off an electric power supply;

the main micro processor stores a power control data, which indicates timings for switching the first to third power control terminals between the high level and the low level during the switching on operation or switching off operation of the power switch, into a rewritable ROM in the main micro processor preliminarily, and upon receiving an electric power supply from the power supply circuit, then transmits the power control data stored in the rewritable ROM to the auxiliary micro processor by a serial communication;

contents of the power control data are composed of sixteen bits data, and each four bits data as a unit indicate a timing for switching the first power control terminal to the low level based on a timing for switching the second power control terminal to the low level during the switching off operation of the power switch, a timing for switching the first power control terminal to the high level based on a timing for switching the second power control terminal to the high level during the switching on operation of the power switch, a timing for switching the third power control terminal to a low level based on a timing for switching the second power control terminal to the low level during the switching off operation of the power switch, and a timing for switching the third power control terminal to a high level based on a timing for switching the second power control terminal to the high level during the switching on operation of the power switch;

in each four bits data, a highest bit data indicates an operation flag whether other two power control terminals are switched to the low level/the high level earlier than the second power control terminal or later than the second power control terminal, and low three bits data indicate a timing to switch the other two power control terminals to the low level/the high level earlier than or later than the second power control terminal;

the auxiliary micro processor stores a default power control data, which indicates timings for switching the first to third power control terminals between the high level and the low level during the switching on operation or the switching off operation of the power switch, into a mask ROM in the auxiliary micro processor preliminarily, and when the power switch is switched on/off until a power control data is transmitted from the main micro processor after the power supply circuit is connected to the commercial AC power, the first to third power control terminals are switched to the high level/the low level at timings indicated by the default power control data stored in the mask ROM, and afterwards, when the power control data is transmitted from the main micro processor, the power control data is stored in a RAM in the auxiliary micro processor, and when the power switch is switched on/off after transmitting the power control data from the main micro processor, the first to third power control terminals are switched to the high level/the low level at timings indicated by the power control data transmitted from the main micro processor stored in the RAM.

* * * * *